(12) United States Patent
Vigeant et al.

(10) Patent No.: US 7,654,556 B2
(45) Date of Patent: Feb. 2, 2010

(54) PASSENGER AIRBAG MODULE

(75) Inventors: Peter L. Vigeant, Troy, MI (US);
Bradley S. Honerman, Armada, MI (US); David L. Geyer, Sterling Heights, MI (US); Robert A. Parks, Berkley, MI (US)

(73) Assignee: Toyoda Gosei Co. Ltd., Gun Aichi (JP)

( * ) Notice: Subject to any disclaimer, the term of this patent is extended or adjusted under 35 U.S.C. 154(b) by 154 days.

(21) Appl. No.: 11/343,992

(22) Filed: Jan. 31, 2006

(65) Prior Publication Data
US 2007/0176398 A1    Aug. 2, 2007

(51) Int. Cl.
*B60R 21/16* (2006.01)

(52) U.S. Cl. .................................. 280/728.2

(58) Field of Classification Search .............. 280/728.2, 280/732, 740; 220/4.28, 4.31
See application file for complete search history.

(56) References Cited

U.S. PATENT DOCUMENTS

| | | | | |
|---|---|---|---|---|
| 2,729,386 A * | 1/1956 | Haddad | ........ | 229/125.19 |
| 3,079,025 A * | 2/1963 | Herman | ........ | 217/12 R |
| 3,613,931 A * | 10/1971 | Schifferle | ........ | 217/12 R |
| 4,221,302 A * | 9/1980 | Kupersmit | ........ | 220/4.31 |
| 4,782,972 A * | 11/1988 | Wenkman et al. | ........ | 220/4.28 |
| 5,069,480 A * | 12/1991 | Good | ........ | 280/732 |
| 5,332,256 A * | 7/1994 | Lauritzen et al. | ........ | 280/728.2 |
| 5,407,223 A * | 4/1995 | Lauritzen et al. | ........ | 280/728.2 |
| 5,458,364 A * | 10/1995 | Mueller et al. | ........ | 280/728.2 |
| 5,511,819 A * | 4/1996 | Spilker et al. | ........ | 280/728.2 |
| 5,558,241 A * | 9/1996 | Huffstutler et al. | ........ | 220/1.5 |
| 5,564,732 A * | 10/1996 | Bauer et al. | ........ | 280/732 |
| 5,566,973 A * | 10/1996 | Green et al. | ........ | 280/728.2 |
| 5,588,667 A | 12/1996 | Emambakhsh et al. | | |
| 5,611,562 A | 3/1997 | Kelley et al. | | |
| 5,676,360 A * | 10/1997 | Boucher et al. | ........ | 269/74 |
| 5,692,768 A | 12/1997 | Mihm et al. | | |
| 5,711,444 A * | 1/1998 | Meacham et al. | ........ | 220/6 |
| 5,732,971 A * | 3/1998 | Lutz | ........ | 280/728.2 |
| 6,161,862 A * | 12/2000 | Rose et al. | ........ | 280/728.2 |
| 6,161,865 A * | 12/2000 | Rose et al. | ........ | 280/728.3 |
| 6,375,219 B2 * | 4/2002 | Keshavaraj | ........ | 280/743.1 |
| 2005/0082793 A1 * | 4/2005 | Lee | ........ | 280/728.2 |

* cited by examiner

*Primary Examiner*—Paul N Dickson
*Assistant Examiner*—Robert A Coker
(74) *Attorney, Agent, or Firm*—Carlson, Gaskey & Olds

(57) ABSTRACT

A passenger airbag module includes opposite side walls connected by a rear wall. The side walls each include at least one inward projection that traps a semi-cylindrical retainer between the projections and the rear wall. The retainer holds the inflator and airbag within the housing. End walls connect the side walls with interlocking channels thereby preventing the side walls from releasing the retainer, inflator and airbag.

28 Claims, 8 Drawing Sheets

US 7,654,556 B2

PASSENGER AIRBAG MODULE

BACKGROUND OF THE INVENTION

The present invention relates generally to airbag modules and more particularly to a passenger airbag module that is held together without the use of separate fasteners.

Passenger airbag modules typically include a housing having spaced apart side walls connected to one another by a rear wall. End walls are connected at each end to the side walls into the rear wall by fasteners, welding or by a relatively complex arrangement of slots and snap-fitting elements or through all of these arrangements. The assembly of the current module is time consuming and includes a number of parts.

Some passenger airbag modules include a generally cylindrical inflator retained in the housing by a semi-cylindrical retainer through which large holes are formed. The opening in the airbag fits around the retainer and is secured to the housing and the inflator by the retainer. However, around the cylindrical inflator, the material in the airbag can become bunched up or folded in an uncontrolled manner between the retainer and inflator. This can create gaps between the retainer and inflator through which the inflator gas may pass.

SUMMARY OF THE INVENTION

An airbag module according to the present invention provides an improved and secure connection of the inflator and airbag within the housing without the use of separate fasteners. The airbag housing includes spaced apart side walls connected by an integral rear wall. The side walls and rear wall are stamped from a sheet of metal. The side walls each include inward projections.

The side walls initially extend at angles away from one another from the rear wall. The inflator is inserted into the housing against the rear wall. A retainer and airbag connect to the rear wall of the housing over the inflator. The side walls are then bent toward one another until the side walls are generally parallel. In this position, the projections from the side walls trap the retainer between the projections and the rear wall. End walls are slid into place at each end of the housing. Channels at side edges of the end walls interlock with channels at end edges of the side walls thus preventing the side walls from being deformed away from one another.

In another feature of the present invention, the airbag includes end panels sewn onto opposite ends of the airbags. The end panels include side tabs and a center tab. The side tabs hook onto the retainer. The center tab is sewn to the airbag adjacent the opening in the retainer to pull the airbag against the concave inner surface of the retainer, thereby eliminating bunching and folding of airbag material at the interface of the retainer and inflator.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENTS

Figure 1:
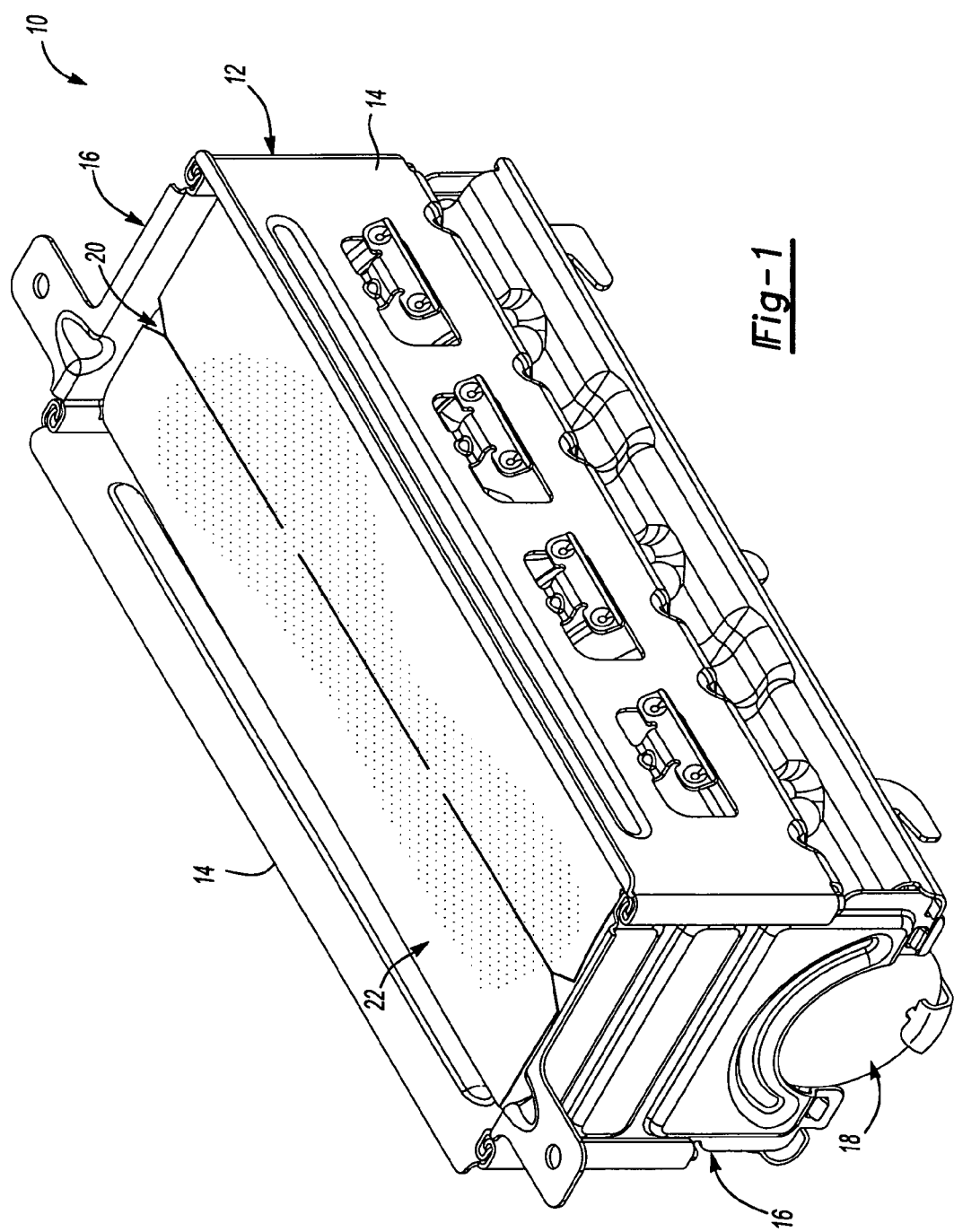
FIG. 1 is a perspective view of a passenger airbag module according to the present invention.

A passenger airbag module 10 according to the present invention is shown in FIG. 1. The module 10 includes a housing 12 having spaced apart side walls 14 and end walls 16. An airbag 20 is folded and stored within the housing 12 and covered by a wrap 22. A generally cylindrical inflator 18 is retained in the housing 12 below the airbag 20.

Figure 2:
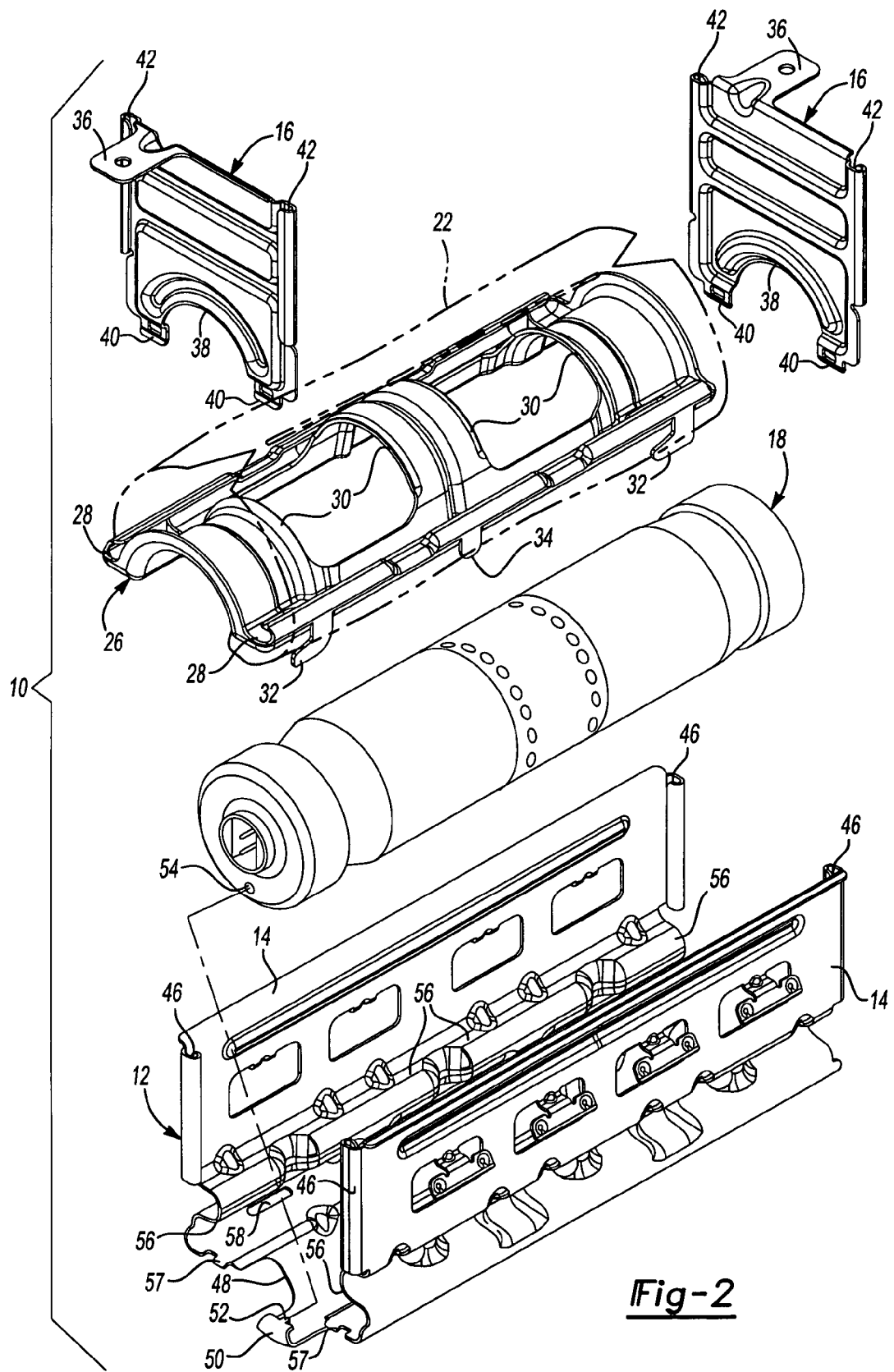
FIG. 2 is an exploded view of the module of FIG. 1.

FIG. 2 is an exploded view of the module 10 of FIG. 1. For clarity, the airbag 20 is not shown and the wrap 22 is shown in phantom. As shown, a generally semi-cylindrical retainer 26 includes a pair of generally parallel spaced apart rails 28 connected by three semi-cylindrical arches 30 defining large openings therebetween. A plurality of L-shaped legs 32 project downwardly from the rails 28. Middle legs 34 projecting downwardly from the rails 28 are spaced off-center between the L-shaped legs 32 in order to prohibit installation of the retainer 26 into the housing 12 in the reversed orientation. The middle legs 34 could also be L-shaped.

Each end wall 16 includes a mounting tab 36 projecting outwardly from an upper edge. Each end wall 16 further includes an arched opening 38 at its lower edge between a pair of snap-fit end tabs 40. The side edges of each end wall 16 include U-shaped channels 42 opening inwardly toward one another. Complementary outwardly opening U-shaped channels 46 are formed on end edges of the side walls 14 of the housing 12.

As can be seen in FIG. 2, the side walls 14, together with a rear wall 48, are formed integrally of a stamped metal sheet. The rear wall 48 includes an inwardly turned tab 50 having an axial pin 52 protruding toward the interior of the housing 12. The pin 52 is complementary to a small aperture 54 at an axial end of the inflator 18. This ensures a proper rotational orientation of the inflator 18 within the housing 12. End snap-tabs 57 project axially outwardly from each axial end of the rear wall 48.

The side walls 14 each include a plurality of inward projections 56 stamped therein. The projections 56 are generally semi-cylindrical and could extend continuously across the entire length of the side walls 14, but preferably are spaced intermittently to provide selected, controlled contact. Slots 58 are formed through the housing 12 below the projections 56.

Figure 3:
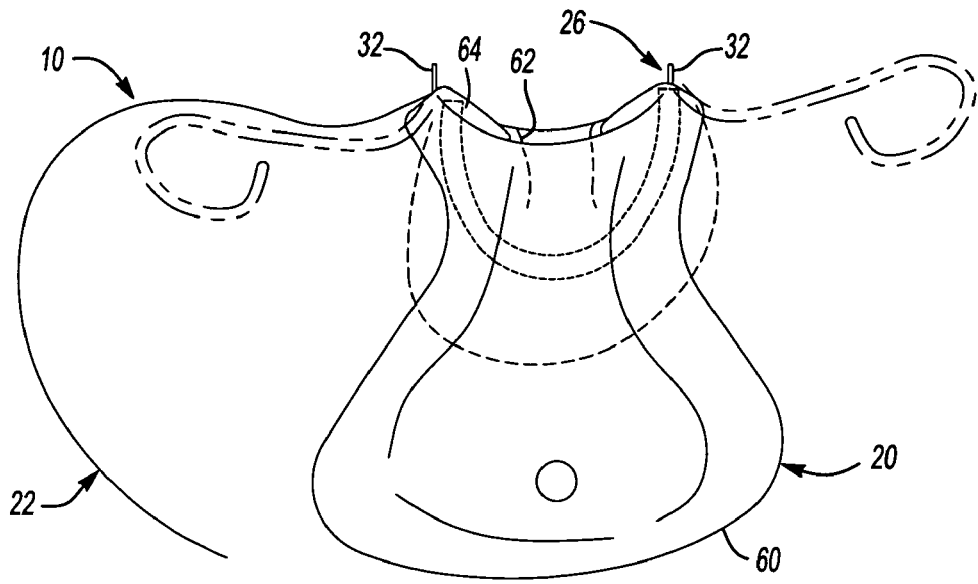
FIG. 3 is a side view of the retainer and airbag of FIG. 1 with the airbag partially unfolded.

FIG. 3 is a side view illustrated attachment of the airbag 20 to the retainer 26. The airbag 20 includes a front panel portion 60 opposite an opening 62 defined by a reinforced portion 64 around the opening 62. The retainer 26 is placed inside the airbag 20 through the opening 62. The legs 32 of retainer 26 are then inserted through the reinforced portion 64 of the airbag 20.

Figure 4:
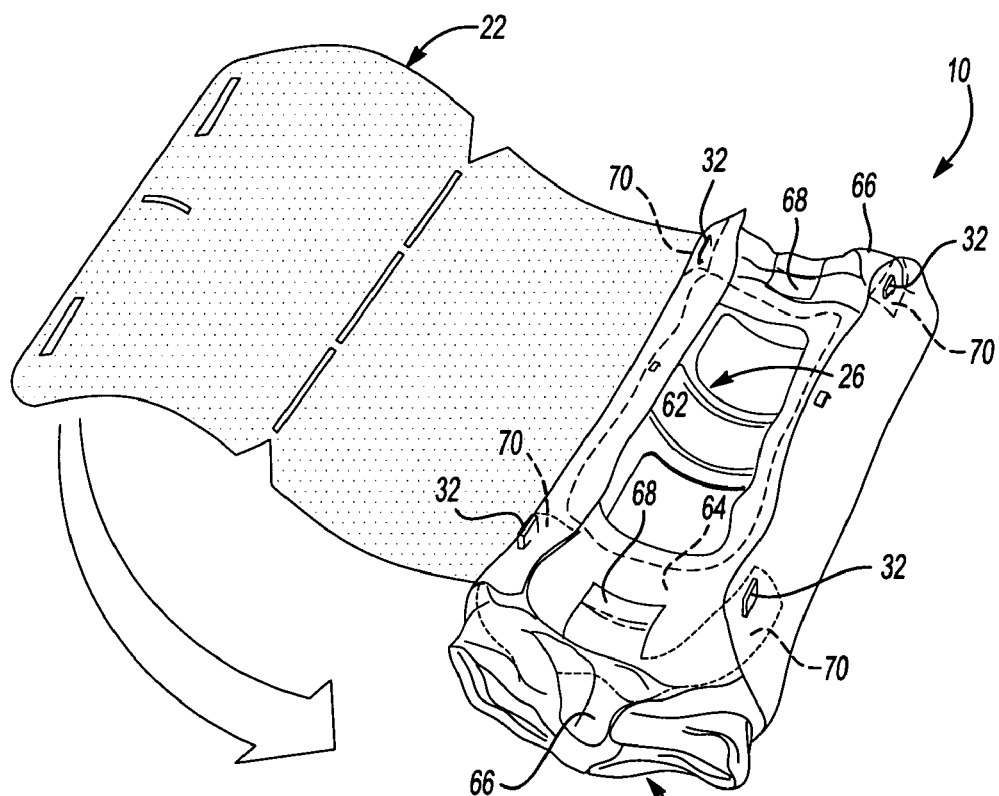
FIG. 4 is a bottom perspective view of the retainer and airbag of FIG. 3 with the airbag folded.
Figure 5:
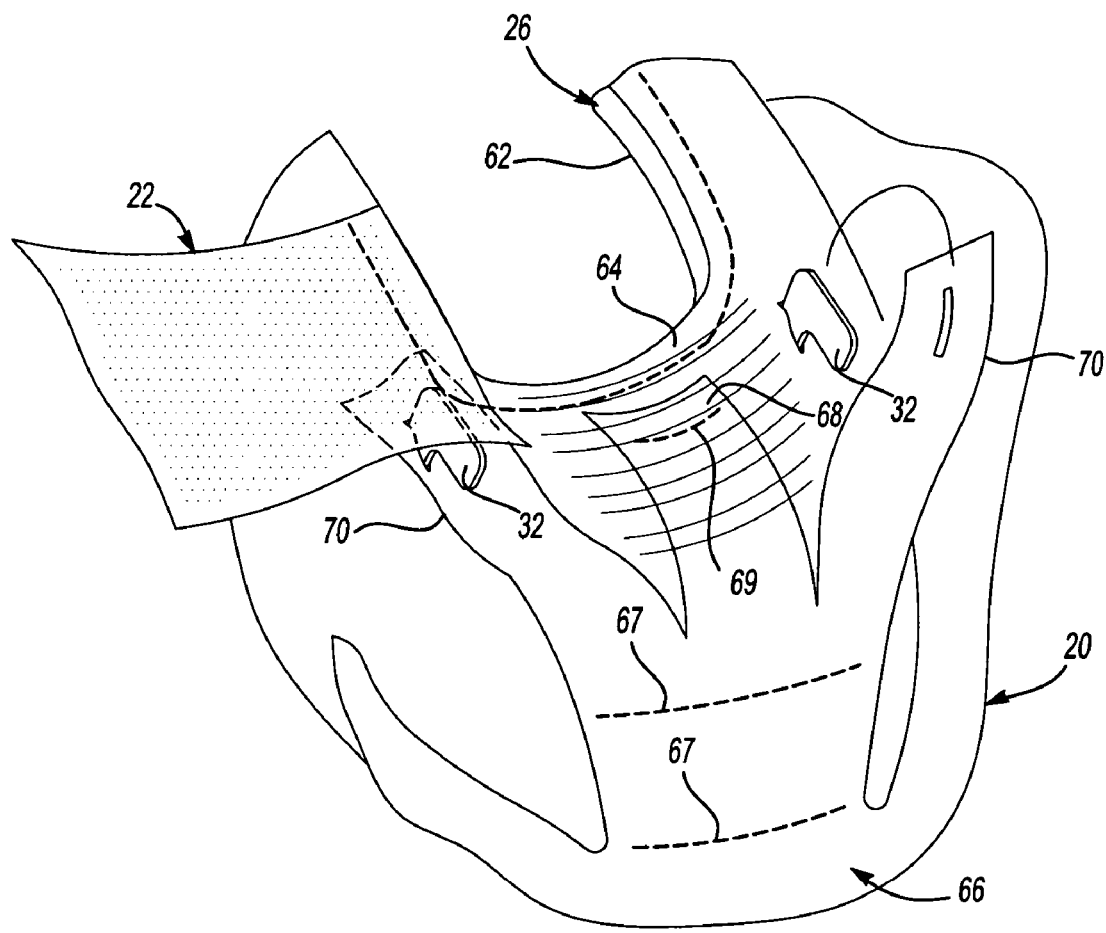
FIG. 5 is an enlarged bottom perspective view of the retainer and airbag of FIG. 4.

FIG. 4 is a perspective bottom view of the retainer 26 and airbag 20 of FIG. 3 with the airbag 20 in its folded position. The airbag 20 includes a pair of end panels 66 sewn onto ends of the airbag 20. The end panel 66 include a center tab 68 and side tabs 70. The legs 32 of the retainer 26 are inserted through slots through the side tab 70. The center tab 68 is sewn to the airbag between the side tabs 70 in order to fit the airbag 20, particularly the reinforced portion 64 around the opening 62, to the concave inner surface of the retainer 26. This is shown more clearly in FIG. 5. The end panel 66 is sewn by stitching 67 to the end of the airbag 20. The center tab 68 is sewn by stitching 69 to the airbag 20 adjacent the reinforced portion 64 and opening 62 to fit the airbag 20 to the concave inner surface of the retainer 26. During assembly of the airbag 20 to retainer 26, the legs 32 are inserted through slots in the airbag 20 adjacent the reinforced portion 64. The legs 32 are then inserted through slots in the side tabs 70 of the end panel 66. The wrap 22 is then wrapped around the folded airbag 20 to keep the airbag 20 in its folded position during shipping and assembly.

Figure 6:
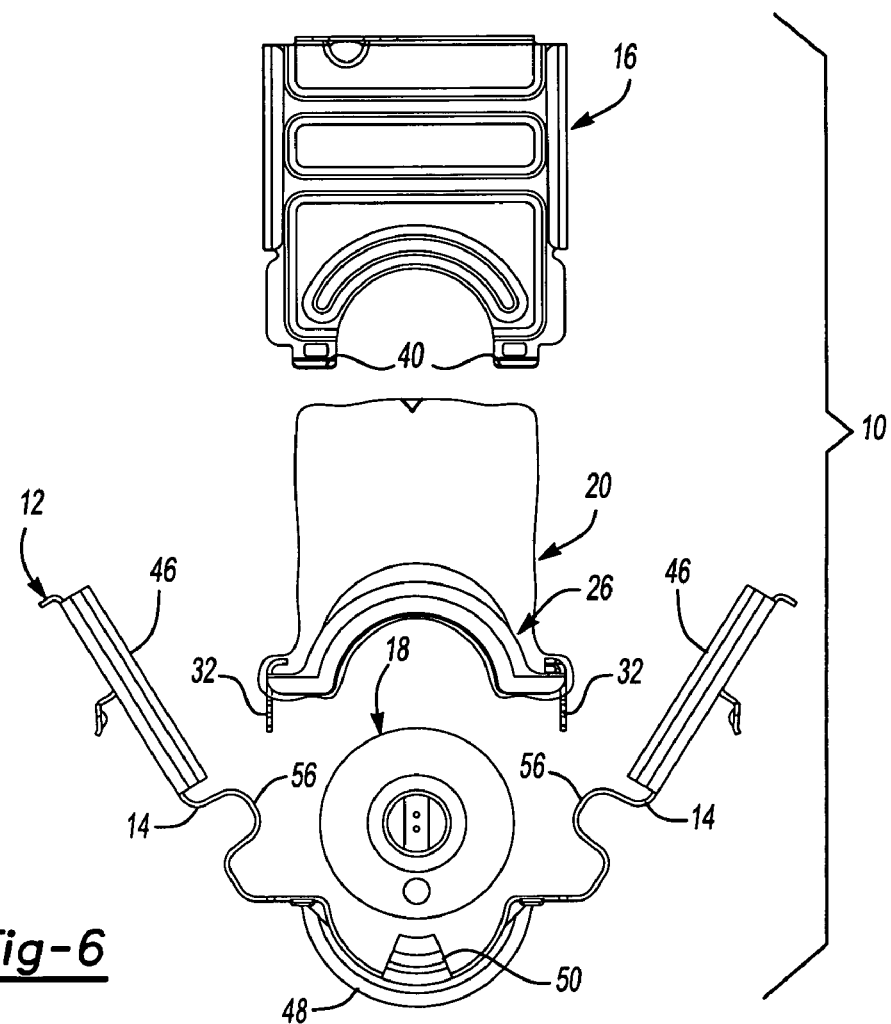
FIG. 6 is an exploded end view of the module of FIG. 1 with the housing in a pre-assembly state.
Figure 7:
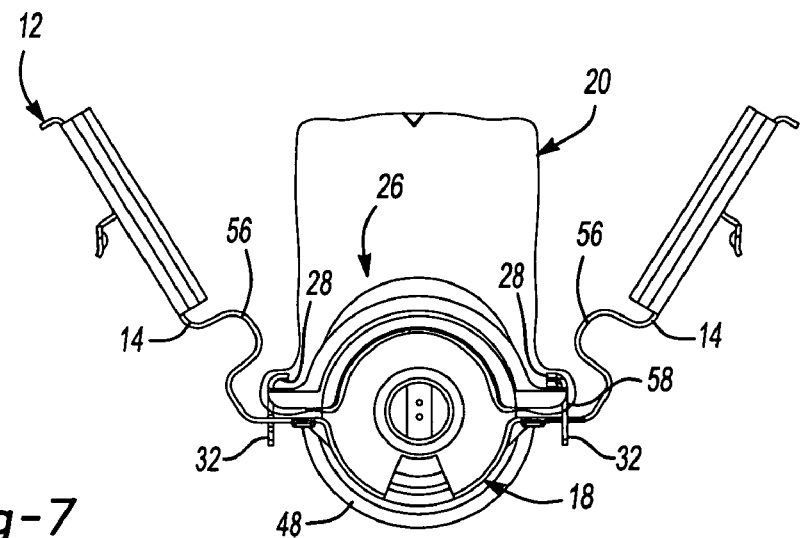
FIG. 7 is an end view similar to FIG. 6 with a retainer and airbag inserted into the housing.

FIG. 6 is an end view showing assembly of the module 10. The housing 12 is sheet metal that is stamped and bent to the shape shown in FIG. 6. The inflator 18 is then inserted or placed into the housing 12 against the rear wall 48. The retainer 26 is placed over the inflator 18. The legs 32 of the retainer 26 are inserted through the slots 58 in the housing 12 as shown in FIG. 7. The retainer 26 and airbag 20 is then slid axially such that the L-shaped legs 32 are inserted under the housing 12. The axial movement of the retainer 26 and the airbag 20 relative to the housing 12 to hook the L-shaped legs 32 ensures the proper orientation of the airbag 20. If the retainer 26 and airbag 20 were oriented 180 degrees from the proper orientation, they would also be slid in the wrong direction to hook the legs 32. This would position at least part of the retainer 26 and/or airbag 20 over the end edge of the housing 12, thereby preventing installation of the endcap 16, which would alert the installer to the improper orientation.

Figure 8:
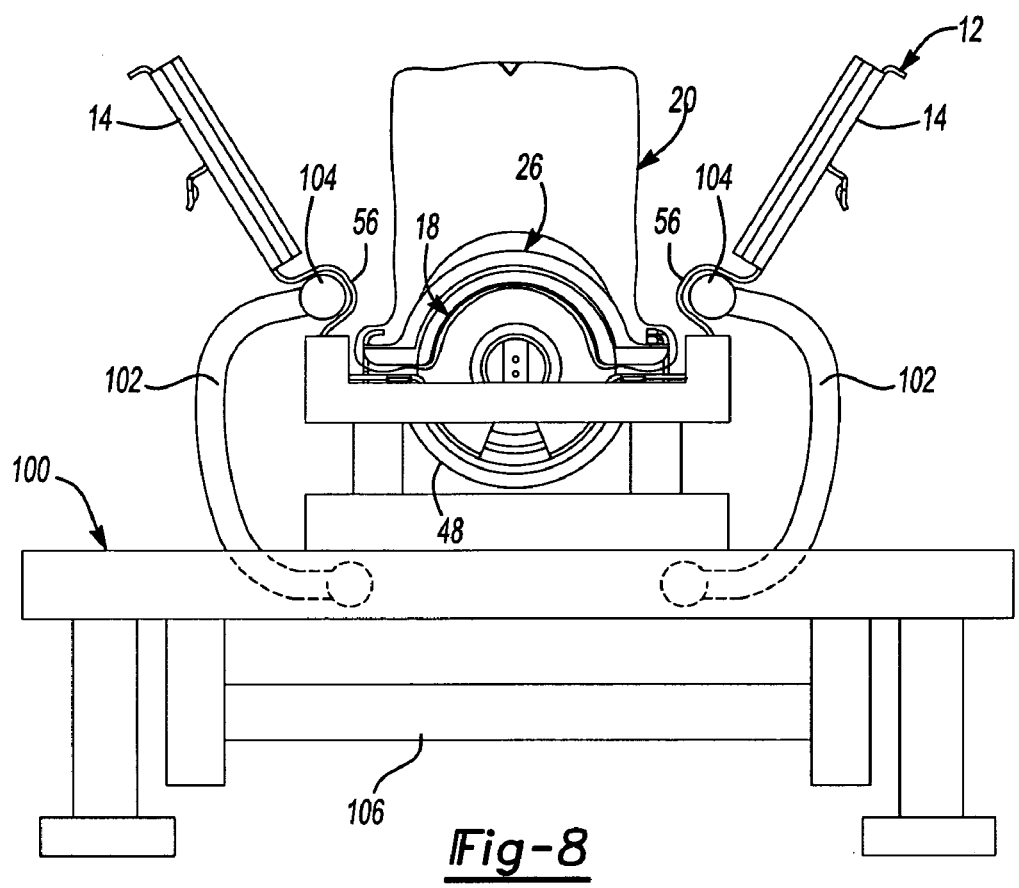
FIG. 8 is an end view of the module of FIG. 7 placed on tooling.
Figure 9:
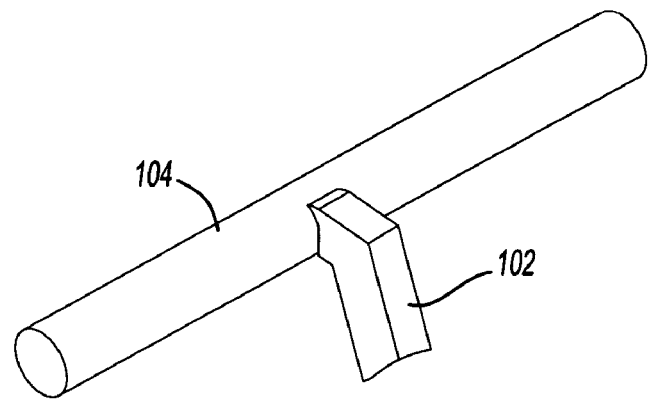
FIG. 9 is an enlarged view of one of the arms of the tooling of FIG. 8.

The assembly of FIG. 7 is then inserted into a tool 100 shown schematically in FIG. 8. The tool 100 includes a pair of opposed arms 102 each having a horizontal bar 104 (an enlarged perspective view of which is shown in FIG. 9). The arms 102 include a mechanism 106 for pressing the bars 104 toward one another, such as a hydraulic, pneumatic or motorized actuator or a lever operated manually by a person. The horizontal bars 104 are aligned behind the projections 56 of the side walls 14.

Figure 10:
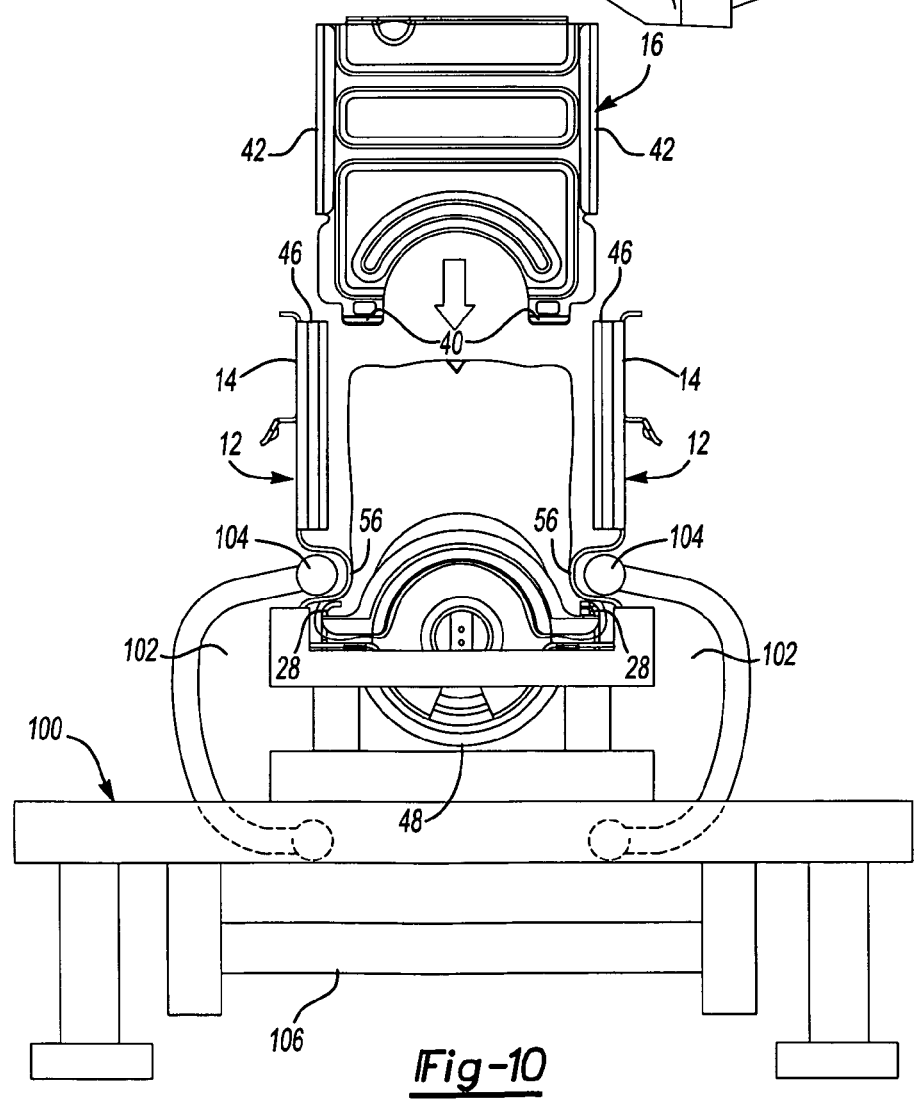
FIG. 10 is a view similar to FIG. 8 after the walls of the housing have been bent to their assembled position and showing the end cap installation.

The arms 102 push the horizontal bars 104 toward one another, thereby bending or deforming the side walls 14 upward to a generally parallel position as shown in FIG. 10. This positions the projections 56 of the walls 14 over the rails 28 of the retainer 26 thereby trapping the inflator 18 between the projections 56 and the rear wall 48 of the housing 12. The rails 28 and the arches 30 hold the airbag 20 in the housing 12 and prevent damage to the airbag 20 when the walls 14 are deformed inwardly and when the end walls 16 are slid into position.

The end walls 16 are then slid into position by aligning the channels 42 on the end walls 16 with the channels 46 on the side walls 14. As the end walls 16 are pushed downwardly, the snap-fit end tabs 40 snap onto end snap-tabs 57 on the housing 12 to retain the end walls 16 to the housing 12.

Figure 11:
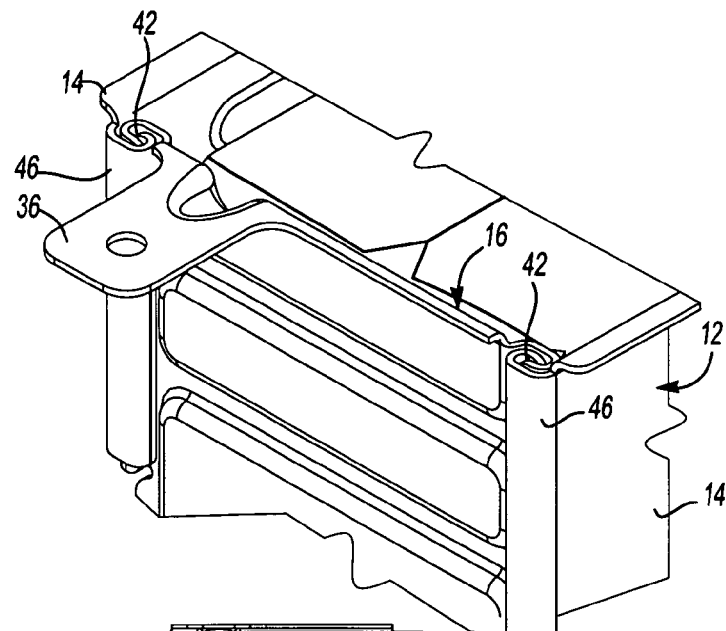
FIG. 11 is an enlarged perspective view of one end of the assembled module.

FIG. 11 is an enlarged perspective view of one end wall 16 connected or secured to the housing 12. As shown, the U-shaped channels 42 (opening inwardly) of the end walls 16 interlock with the U-shaped channels 46 (opening outwardly) of the side walls 14 thereby preventing outward deformation of the side walls 14.

Figure 12:
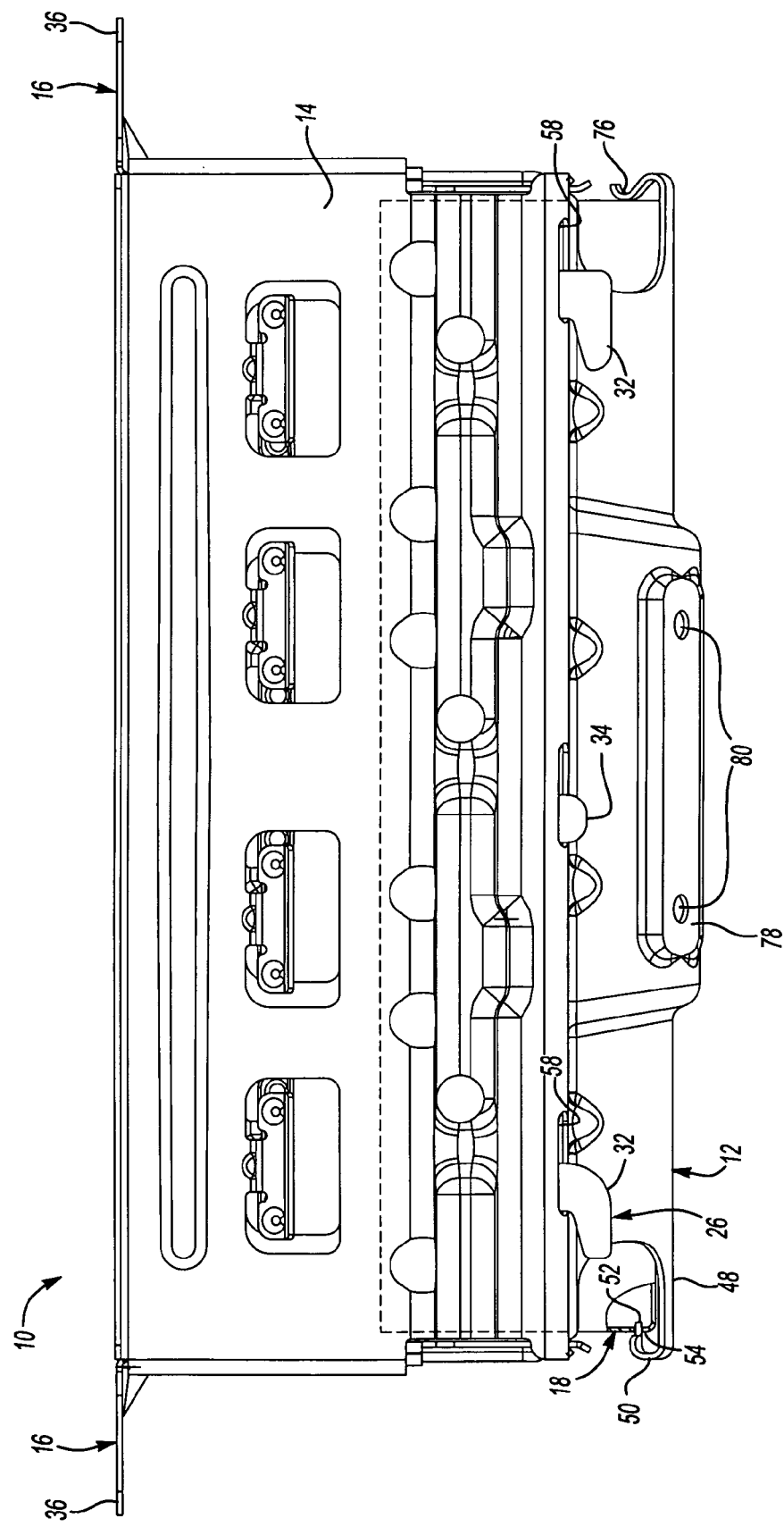
FIG. 12 is a side view of the assembled module.

FIG. 12 is a side view of the assembled module 10, with the inflator 18 shown in phantom and partially sectioned. The pin 52 on the end tab 50 is received within the aperture 54 in the axial end of the inflator 18. This ensures that the inflator 18 is inserted into the housing 12 in the proper orientation and holds the inflator 18 in the proper orientation during assembly and in use. Having a consistent, proper orientation of the inflator 18 provides a consistent orientation of the electrical connectors on the inflator 18, which facilitates assembly. It also prevents rotation of the inflator 18 in the field, which can twist the wires connected to the inflator 18.

As shown, the L-shaped legs 32 extending through the slots 58 and the housing 12 additionally secure the retainer 26 (and thereby the inflator 18) within the housing 12. A deformable end tab 76 is formed at the opposite axial end of the housing 12 to contact the opposite end of the inflator 18 to define the axial position of the inflator 18. Complementary locating features, such as ribs or flanges, may also be formed on the underside of the retainer 26 and the outer surface of the inflator 18 to define and preserve axial location.

As shown, a mounting bracket 78 may be stamped into the rear wall 48 of the housing 12. The mounting bracket 78 may include apertures 80 for connecting to the vehicle, although different methods of attachment of the housing in the vehicle can be used.

The passenger airbag module 10 of the present invention provides a securely retained inflator 18 and airbag 20 within the housing 12. The housing 12 is assembled without the use of fasteners, thereby providing a more secure connection with easier assembly and fewer parts. The airbag 20 provides a better fit to the concave surface of the retainer 26, thereby eliminating or reducing gaps through the material which may permit the escape of gas of the inflator 18.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope. For example, although the invention is described with respect to a passenger front airbag, it could also be used for any airbag location. Alphanumeric identifiers on method steps are for convenient reference in dependent claims and do not signify a required sequence of performance unless otherwise indicated in the claims.

What is claimed is:

1. An airbag assembly comprising:
a pair of side walls spaced from one another;
a rear wall connecting the pair of side walls;
an end wall;
means for connecting the end wall to the side walls by sliding the end wall in a direction generally perpendicular to the rear wall and toward the rear wall; and
an airbag between the side walls, the airbag extending from one of the side walls to the other of the side walls.

2. The airbag assembly of claim 1 wherein the means for connecting includes at least one channel for connecting the end wall to the side walls.

3. The airbag assembly of claim 2 wherein the at least one channel is formed on one of the end wall and one of the side walls.

4. The airbag assembly of claim 1 further including an airbag inflator between the side walls, at least one of the airbag and the airbag inflator contacting both of the pair of side walls.

5. The airbag assembly of claim 1 wherein the airbag occupies at least a substantial portion of a distance the pair of side walls.

6. An airbag assembly comprising:
a pair of side walls spaced from one another;
a rear wall connecting the pair of side walls;
an end wall slidably connected to the side walls, wherein the side walls each include at least one channel formed therein, the end wall being slidable into the channels in a direction toward the rear wall; and
an airbag between the side walls, the airbag extending from one of the side walls to the other of the side walls.

7. The airbag assembly of claim 6 wherein the end wall snap-fits to the rear wall.

8. The airbag assembly of claim 6 wherein the end wall includes channels along side edges, the channels in the end wall interlocking with the channels in the side walls.

9. The airbag assembly of claim 6 further including an airbag inflator between the side walls, at least one of the airbag and the airbag inflator contacting both of the pair of side walls.

10. An airbag assembly comprising:
a pair of side walls spaced from one another, wherein at least one of the side walls includes a first projection toward the other of the side walls;
a rear wall connecting the pair of side walls;
an end wall;
means for connecting the end wall to the side walls by sliding the end wall in a direction generally perpendicular to the rear wall and toward the rear wall;
an airbag between the side wall; and
a retainer secured between the first projection and the rear wall by the first projection.

11. The airbag assembly of claim 10 further including an inflator between the retainer and the rear wall.

12. The airbag assembly of claim 11 wherein the other of the side walls includes a second projection toward the one of the side walls, the retainer secured between the second projection and the rear wall by the second projection.

13. The airbag assembly of claim 12 wherein the retainer includes a pair of rails between which extend a plurality of arches, the rails secured between the first projection and the second projection and the rear wall.

14. A method for assembling an airbag including the steps of:
a) forming spaced apart walls connected by a rear wall;
b) forming a first projection from one of the spaced apart walls;
c) placing a retainer between the first projection and the rear wall; and
d) deforming the spaced apart walls toward one another to trap the retainer between the first projection and the rear wall.

15. The method of claim 14 further including the step of placing an inflator between the retainer and the rear wall before said step d).

16. The method of claim 15 further including the step of mounting an airbag to the retainer.

17. The method of claim 14 wherein the spaced apart walls include a pair of side walls and the first projection is formed from one of the side walls, the method further including the step of forming a second projection from the other of the side walls, the first projection and the second projection protruding toward one another.

18. The method of claim 14 further including the step of, after said step d), securing the spaced apart walls to one another by end walls to prevent deformation of the spaced apart walls away from one another.

19. An airbag assembly comprising:
a pair of side walls spaced from one another, at least one of the side walls having an inward projection therefrom;
a rear wall connecting the pair of side walls; and
a retainer between the side walls, the retainer positioned between the inward projection and the rear wall, the retainer including a pair of rails between which extend a plurality of arches opening toward the rear wall, the plurality of arches defining at least one opening therebetween, the rails trapped between the inward projection and the rear wall.

20. The airbag assembly of claim 19 wherein the pair of side walls each have the inward projection therefrom, the retainer trapped between the inward projections and the rear wall.

21. The airbag assembly of claim 20 further including an inflator trapped between the retainer and the rear wall, the inflator positioned directly between the inward projections.

22. The airbag assembly of claim 21 further including an airbag having a front panel opposite an opening to the airbag, the retainer disposed at least substantially inside the airbag, the airbag pinned between the retainer and the rear wall.

23. The airbag assembly of claim 19 wherein the retainer includes L-shaped legs extending through the rear wall and under the rear wall.

24. The airbag assembly of claim 19 further including at least one end tab projecting forward from the rear wall, the inflator abutting the end tab to define an axial position of the inflator, the end tab including a locating feature complementary to a locating feature on an axial end of the inflator.

25. A method for assembling an airbag including the steps of:
a) forming spaced apart side walls connected by a rear wall;
b) placing an airbag inflator between the side walls;
c) after said step b), sliding an end wall between the side walls in a direction toward the rear wall to connect the end wall to the side walls.

26. The method of claim 25 wherein the step of sliding further includes the step of sliding the end wall within channels in the side walls to connect the end wall to the side walls.

27. The method of claim 26 further including the step of snap-fitting the end wall to the rear wall by said step of sliding.

28. The method of claim 25 further including the step of securing the airbag inflator in contact with at least one of the rear wall and the side walls.

* * * * *